US008751247B1

(12) United States Patent
O'Neil

(10) Patent No.: US 8,751,247 B1
(45) Date of Patent: Jun. 10, 2014

(54) NETWORK-BASED COLLABORATIVE CONTROL OF DISTRIBUTED MULTIMEDIA CONTENT

(75) Inventor: Joseph Thomas O'Neil, Staten Island, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 996 days.

(21) Appl. No.: 10/155,403

(22) Filed: May 23, 2002

(51) Int. Cl.
G06Q 10/00 (2012.01)

(52) U.S. Cl.
USPC .......................................................... 705/1.1

(58) Field of Classification Search
USPC .......................................................... 705/1.1
See application file for complete search history.

(56) References Cited

U.S. PATENT DOCUMENTS

| | | | | |
|---|---|---|---|---|
| 4,785,472 A | * | 11/1988 | Shapiro | 379/93.19 |
| 5,808,662 A | * | 9/1998 | Kinney et al. | 348/14.1 |
| 5,896,128 A | * | 4/1999 | Boyer | 715/716 |
| 5,916,302 A | * | 6/1999 | Dunn et al. | 709/204 |
| 6,040,851 A | | 3/2000 | Cheng et al. | |
| 6,155,840 A | | 12/2000 | Sallette | |
| 6,237,025 B1 | * | 5/2001 | Ludwig et al. | 709/204 |
| 6,288,753 B1 | | 9/2001 | DeNicola et al. | |
| 6,351,762 B1 | * | 2/2002 | Ludwig et al. | 709/204 |
| 6,430,567 B2 | * | 8/2002 | Burridge | 707/102 |
| 6,611,822 B1 | * | 8/2003 | Beams et al. | 706/11 |
| 6,704,294 B1 | * | 3/2004 | Cruickshank | 370/265 |
| 6,859,821 B1 | * | 2/2005 | Ozzie et al. | 709/205 |
| 6,959,322 B2 | * | 10/2005 | Ludwig et al. | 709/204 |
| 6,981,022 B2 | * | 12/2005 | Boundy | 709/204 |
| 7,007,235 B1 | * | 2/2006 | Hussein et al. | 715/751 |
| 2002/0078150 A1 | * | 6/2002 | Thompson et al. | 709/204 |
| 2002/0132216 A1 | * | 9/2002 | Dohrmann | 434/362 |
| 2002/0149617 A1 | * | 10/2002 | Becker | 345/751 |
| 2003/0072429 A1 | * | 4/2003 | Slobodin et al. | 379/202.01 |
| 2003/0088875 A1 | * | 5/2003 | Gay et al. | 725/88 |
| 2003/0182375 A1 | * | 9/2003 | Zhu et al. | 709/205 |

* cited by examiner

*Primary Examiner* — Shannon Campbell
(74) *Attorney, Agent, or Firm* — Wolff & Samson, PC

(57) ABSTRACT

An architecture and system allows for collaborative control and viewing of like multimedia content that is loaded in a number of distributed network-based appliances. A collaboration server in the data network is used to store and retrieve information regarding each collaboration session and serves as a clearing house to forward control commands ("play", "pause", etc.) from one participant to the other participants during a session. The arrangement is particularly well-suited to a distance learning environment, where an instructor may be given "override" commands to control the various events in the collaboration session.

20 Claims, 5 Drawing Sheets

70

| COLLABORATION A1 B2 | | | |
|---|---|---|---|
| PARTICIPANT ID | PARTICIPANT PWD | IP ADDRESS | OVERRIDE CONTROL ? |
| DIAL-IN NUMBER | HOST CODE | AB.BCD.CDE.DE | YES |
| ABC-DEF-GHIJ | PARTICIPANT CODE | AA.BBB.CC.DDD | NO |
| ABC-DEF-GHIJ | PARTICIPANT CODE | ZZZ.YY.XXXX.WW | NO |
| | | | |
| | | | |

72  74  76  78

NETWORK-BASED COLLABORATIVE CONTROL OF DISTRIBUTED MULTIMEDIA CONTENT

TECHNICAL FIELD

The present invention relates to collaborative viewing of distributed multimedia content and, more particularly, to a network-based arrangement for controlling the collaborative viewing session.

BACKGROUND OF THE INVENTION

Throughout history, individuals have needed to congregate together to collaboratively create, review and discuss various types of media, such as works of art, literature, business projects, etc. One exemplary domain where such collaboration has occurred is the classroom. Classroom instruction may be effective, but it is often difficult, costly and at times inconvenient to arrange for many people from disparate locations to meet together for educational (or business) purposes. To solve the problem of bringing people together, complex technologies have been developed to facilitate distributed learning. One such technology uses satellite broadcasts or other closed-circuit links to provide two-way video and audio communication between an instructor at a broadcast center with audience members at one or more remote classrooms. However, this solution is less than ideal since it requires specialized hardware to be present at the instructor's location, as well as at each classroom.

Today, many people have embraced the "information age" and depend upon multimedia devices to provide them with a means to receive current information, as well as the ability to communicate with other people. Many homes now include at least one personal computer and television. In addition, many people own set-top boxes (STBs) for controlling cable-received media for their televisions, as well as DVD players, scanners and software for enabling their personal computers and televisions to be used as multimedia communication devices (hereinafter referred to as "appliances"). Currently, these (and other) personal multimedia devices function to only store and display multimedia content. There is no mechanism that permits a disparate group of individuals (hereinafter referred to as "participants") to collaboratively view copies of the same multimedia content that is stored on multiple appliances.

SUMMARY OF THE INVENTION

The need remaining in the prior art is addressed by the present invention, which relates to collaborative viewing of distributed multimedia content and, more particularly, to a network-based arrangement for controlling the collaborative viewing session.

In accordance with the present invention, each individual intending to participate in a collaborative session has a copy of the multimedia content stored on his/her own appliance, where the appliance includes a network connection (such as a set-top box and cable modem, or the like). The participants begin the collaboration session by first initiating a conference call over a separate telephone connection. The participants then request a page, over a data communication link, from a designated Web server used to control such distributed multimedia collaborations. Each participant then enters the appropriate "log in" information required for that individual to participate in a particular collaboration session (i.e., ID and password). A data network server (referred to as a "collaboration server") retains all of the necessary IP address and other information required to transmit commands between each participant during a session. Once a participant has been accepted into a session, he/she will have the ability to control and collaborate with others on a particular multimedia content that each individual will be simultaneously viewing on their own appliance. Common commands that are then accessible by the participants include, but are not limited to, "play, stop, reverse, forward, pause, skip, search".

One application of the present invention is in the distance learning environment, where an instructor may have preference, via the collaboration server, in controlling the multimedia commands with respect to the students (i.e., the students may be "locked out" from pausing the content, skipping content, etc.). As in the other applications, each individual has first received a copy of the multimedia content to be reviewed collaboratively. Upon establishment of the simultaneous teleconference, each student then begins to "play" the multimedia on his home appliance. The instructor's various commands ("pause", "skip", etc.) are then sent via the network server to each student's home appliance so that each multimedia session occurs in synchronization.

Other and further applications and embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
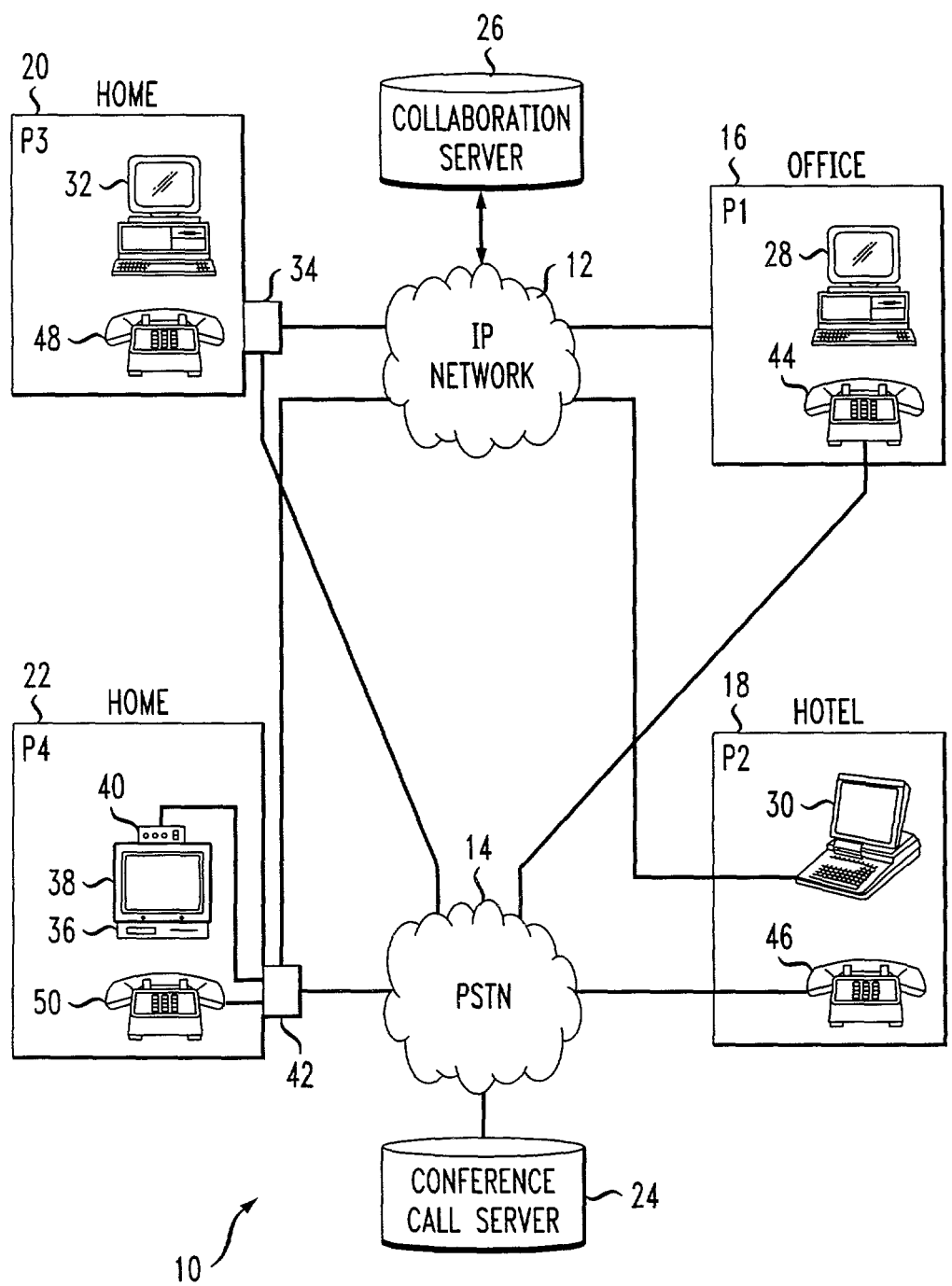
FIG. 1 illustrates an exemplary network arrangement for utilizing the collaborative multimedia viewing functionality of the present invention.

FIG. 1 illustrates one exemplary network architecture 10 that may be used to implement the collaborative viewing of distributed multimedia content in accordance with the present invention. In this particular arrangement, a number of individuals ("participants") are located in various, separate locations, but wish to view and collaborate on a particular multimedia event, such as marketers viewing a particular video presentation (e.g., commercial) to be broadcasted to consumers, television producers reviewing and editing a TV show, etc. In this case, the collaboration is taking place among "equals", where every participant is equally likely to need to (or want to) control the viewing of the multimedia content.

In the particular arrangement of FIG. 1, network architecture 10 includes a digital (e.g., IP) network 12 for providing communication between each participant's network appliance (such as a PC or set-top box controlled-television) and a voice (e.g., PSTN) network 14 for establishing a teleconference link between the participants. As shown, a first participant P1 is located at an office environment 16, a second participant P2 is located at a hotel 18, a third participant P3 is located at a first residential location 20, and a fourth participant P4 is located at a second residential location 22. Associated with voice communication network 14 is a conference call server 24 for controlling the set up and take down of conference calls, and (as will be discussed in detail below) associated with data network 12 is a collaboration server 26 for establishing and controlling the viewing of distributed multimedia content in accordance with the teachings of the present invention.

It is to be noted that various and disparate multimedia devices can be used to allow for individuals at different locations to participate on the same collaboration, as long as the devices are connected to data communication network 12 and can be controlled by external commands as supplied via collaboration server 26. For example, participant P1 may have installed the particular DVD to be viewed in his/her office PC 28 that is connected (in a manner not shown) to data network 12. Participant P2 may have installed a copy of the same DVD on a laptop computer 30 and connected the computer to data network 12 through a dial-up connection at the hotel. Participant P3 may have installed a copy of the DVD on a home computer 32, which is connected through a modem 34 to network 12. Lastly, participant P4 may have used the DVD with a home DVD player 36 connected to a TV 38 and associated set-top box 40. As shown, box 40 is then connected via a unit such as a broadband telephony interface (BTI) 42 to data network 12. Each participant's location also has a separate telephone (referenced as elements 44, 46, 48 and 50 in FIG. 1) connected in a conventional manner to voice network 14.

Figures 2, 3:
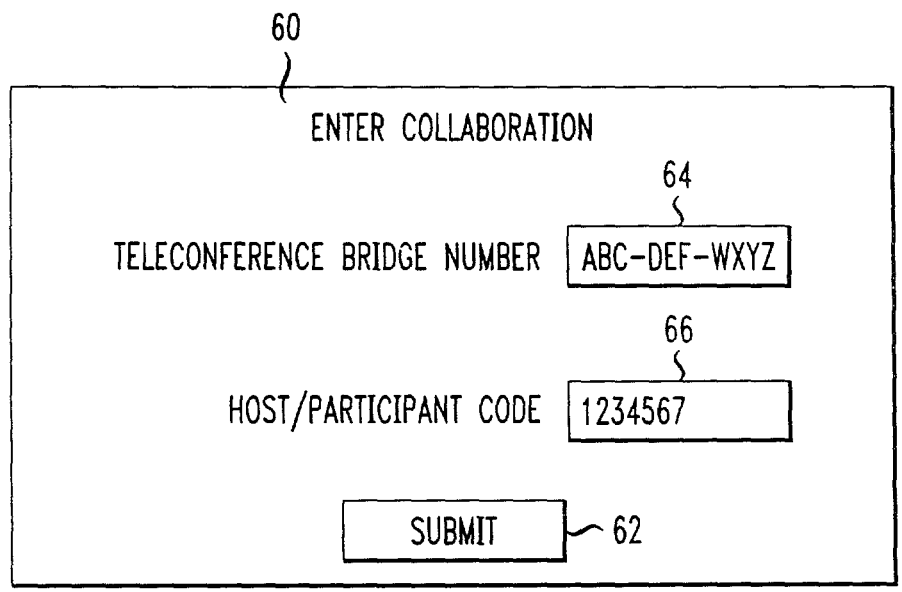
FIG. 2 is exemplary of a web-based page used to initiate a collaborative viewing session in accordance with the present invention.
FIG. 3 contains an exemplary table that may be used at a collaboration server to store information regarding the participants of various collaborative viewing session.

In accordance with a preferred embodiment of the present invention, the participants have pre-arranged a teleconference call that will correspond to the collaborative viewing event, with the dial-in number and the host/participant codes necessary for the conference call being stored in conference call server 24. In a conventional manner, each participant dials into the conference call at the pre-arranged time, and their various telephone lines are bridged together to create a conference call. Once the conference call is established, each participant then enters a request for a "collaboration initialization" page, via his network appliance, where this request is forwarded by data network 12 to collaboration server 26. Collaboration server 26 then responds by "pushing" an initialization page, such as the "enter collaboration" page 60 illustrated in FIG. 2, to each requested participant. The participant then enters the requested information and sends this information back to collaboration server 26 via a return communication path, identified in this example by the "submit" button. In the particular case illustrated in FIG. 2, the teleconference bridge number and host/participant code numbers used to establish the voice conference call are also used to initiate the collaborative viewing session, where the bridge number is entered into field 64 and the host/participant code is entered into field 66. In its most general form, any appropriate user ID/password information that will be recognized by collaboration server 26 may be used. The entered participant information is then stored in a table located at collaboration server 26, where FIG. 3 illustrates one exemplary table 70 that may be used to correlate participants with various on-going collaborative viewing sessions. In one embodiment, collaboration server 26 could use a different table for each session in progress, where table 70 of FIG. 3 is shown as identified with collaboration ID A1B2. Stored in table 70 is each participant's ID (in field 72), participant password in field 74, and the unique IP address of each participant's network-based appliance in field 76. Any special privileges associated with a participant may be indicated in field 78, which in FIG. 3 is defined as "override control". In some cases, such as in the distance learning example discussed hereinbelow, the "override control" may be used to allow for an instructor to "block" or "disregard" control commands submitted by the remaining participants (i.e., students). Importantly, collaboration server 26 will then use the IP address of each participant to forward various control commands during the collaborative viewing session.

Once the proper participant user information has been sent to and accepted by collaboration server 26, the collaborative viewing session may commence. In its most basic form, one participant would then begin the "play" process, using the conventional command elements associated with his/her appliance (such as clicking on the "hot keys" associated with viewing a DVD on a home PC, for example). Referring to the particular arrangement of FIG. 1, participate P3 may initiate the "play" process on his home PC 32, which would then transmit this command via modem 34 over a data link D1 through data network 12 to collaboration server 26. Collaboration server 26 would check the IP address, for example, associated with the received command and determine the remaining IP addresses associated with this collaboration session. Collaboration server 26 would then transmit the "play" command, appended to each receiving EP address, back through data network 12 and to each of the remaining network appliances 28, 30 and 38.

The process would then continue in the same manner, where each time one of the participants enters a particular command code, collaboration server 26 would receive the command, identify the associated participants and relay the command to each of the other participants. For example, participant P2 may enter a "pause" command so that the group could discuss a particular event that just transpired in the multimedia presentation they are viewing. The "pause" command would be sent from her laptop 30 to data network 12 and forwarded to collaboration server 26. Collaboration server 26 would retrieve the IP address associated with laptop 30, find the remaining IP addresses for this particular collaboration session and send the "pause" command to network appliances 28, 32 and 38.

Figure 4:
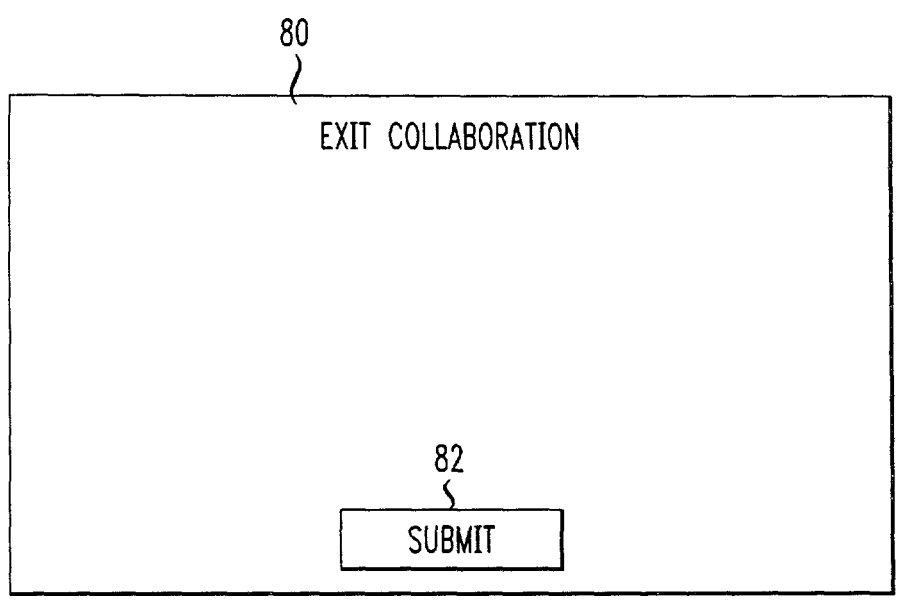
FIG. 4 is exemplary of a web-based page used to exit a collaborative viewing session in accordance with the present invention.

At any time, one or more of the participants may wish to end his/her involvement in the collaborative viewing session. To effectuate this event, the participant requests an "exit" page from collaboration server 26, one exemplary "exit collaboration" page 80 being illustrated in FIG. 4. Since all of the individual's information is already stored at server 26, submitting a request (such as by using "submit" button 82 on page 80) is sufficient to remove that participant's ID and IP address information from the appropriate table location in server 26.

Figure 5:
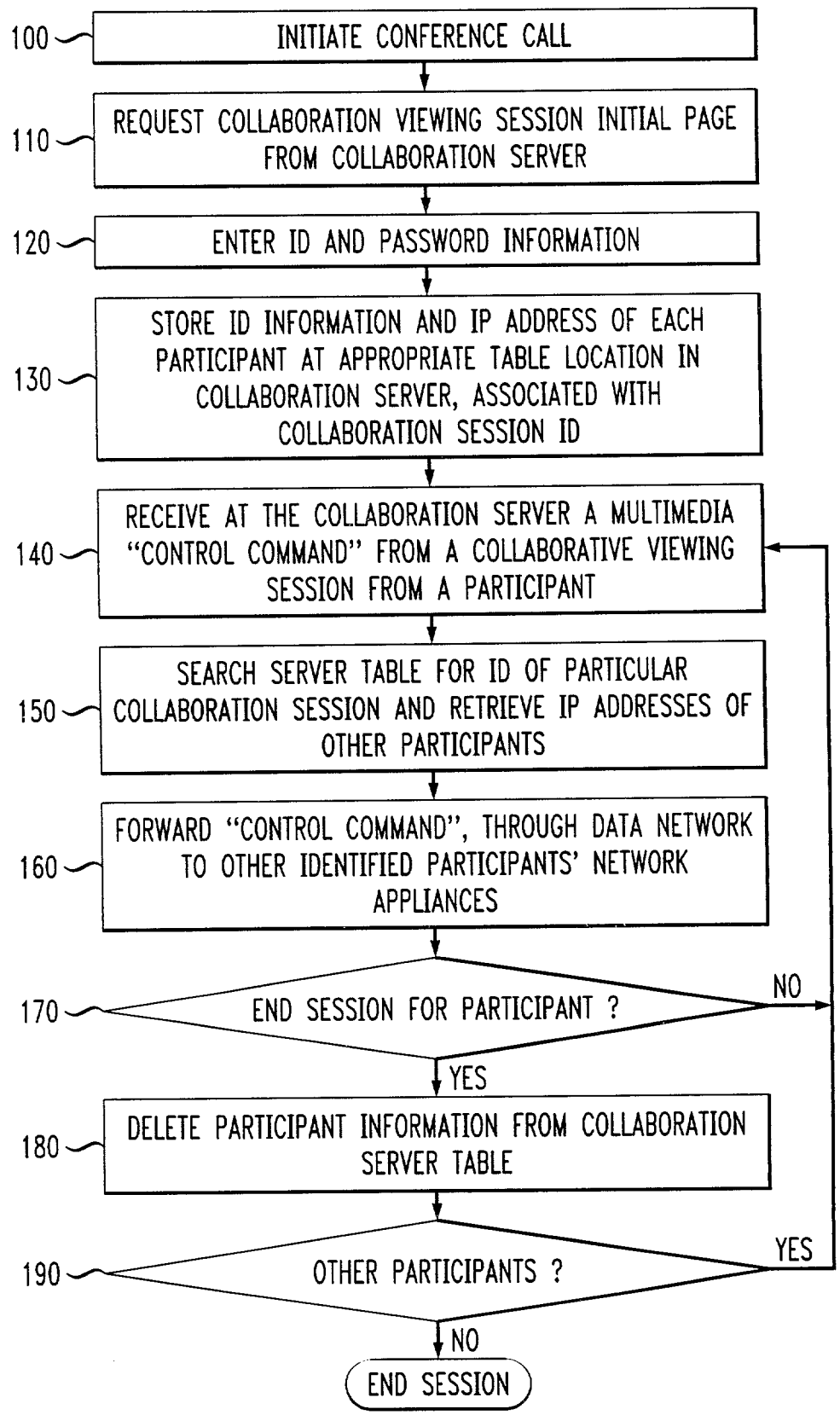
FIG. 5 is an exemplary process flowchart of a collaborative viewing session in accordance with the present invention.

FIG. 5 contains a flowchart, illustrating at a relatively high level, a command process associated with implementing network-based control of collaborative viewing of distributed multimedia content in association with the present invention. As shown and as discussed above, the process is begun (step 100) by initiating a pre-arranged teleconference call between the various participants. At any time after the conference call has begun, the participants may begin the collaborative viewing of the multimedia content, each participant viewing his/her own copy of the multimedia as stored on his/her networked appliance (such as a networked DVD/TV combination, PC, laptop, etc.). The collaborative viewing process is started by each participant requesting the "enter collaboration" page (FIG. 2) from collaboration server 26

(step 110). Each participant then enters the proper ID and password information (step 120), which in a preferred embodiment will be the same information used to initiate the teleconference call (i.e., the teleconference bridge number and host/participant code). The participant's information is then transmitted over data network 12 and stored at the proper table location within collaboration server 26 (step 130).

Once collaboration server 26 has the stored information, it will wait to receive various commands from the participants of the collaborative viewing session and function to distribute the received commands to the other participants of the viewing session. Once a command has been received by a participant of a collaborative viewing session (step 140), server 26 will search through the stored information and find the viewing session associated with the IP address appended to the retrieved command (step 150). When the proper table has been retrieved, server 26 will then transmit the received command to the network-based appliances associated with the remaining IP addresses (step 160). The process continues, with server 26 waiting to receiver an "end session" command from any participant (step 170). Until such a command is received, the process loops through the steps of "receiving", "retrieving" and "transmitting" (steps 140, 150 and 160), as discussed above. When an individual has requested an "end session" page (FIG. 3), server 26 will recognize this request (step 170) and remove the information regarding this participant from the relevant table (i.e., remove the participant's ID information and the associated IP address of his network-based appliance). Server 26 will then interrogate the table to determine if other participants remain in the session (step 180). If so, the process will loop back as discussed above. If there are no participants remaining, the entire session will end (step 190).

Figure 6:
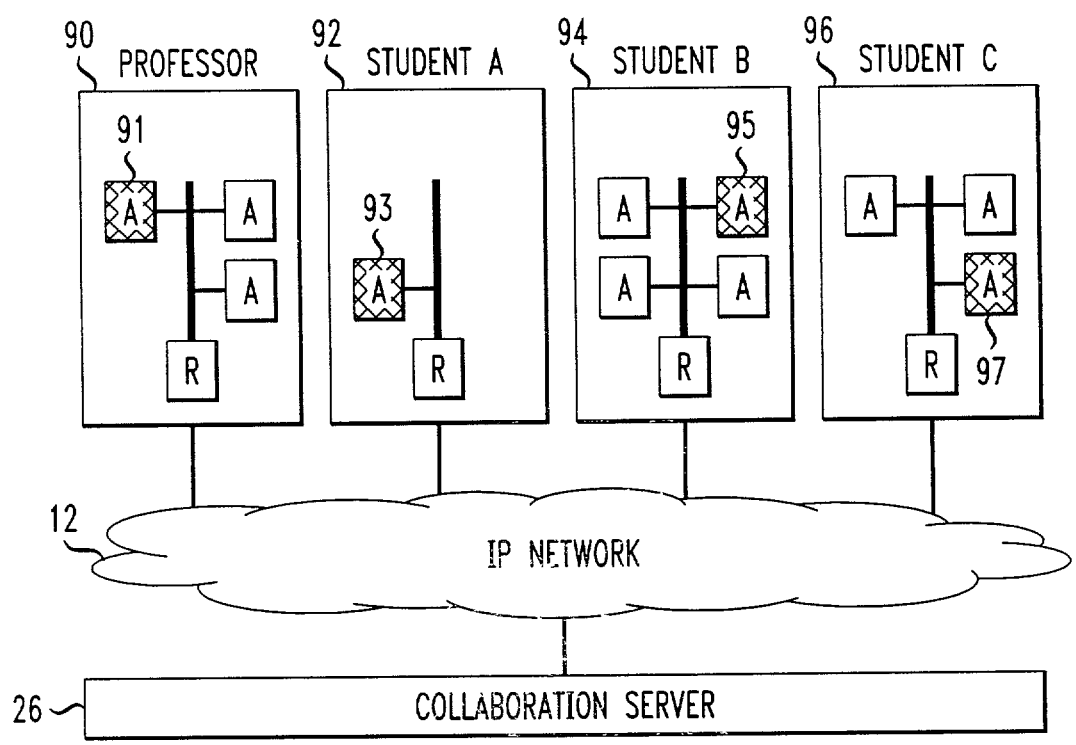
FIG. 6 illustrates an exemplary "distance learning" network arrangement for utilizing collaborative multimedia content viewing in accordance with the present invention.

As mentioned above, the collaborative viewing system of the present invention is particularly well-suited for "distance learning" environments, where an instructor is simultaneously working with a number of students that may all be at different locations. FIG. 6 illustrates an exemplary simplified architecture useful for discussion this particular embodiment of the present invention. IP network 12 and collaboration server 26 are as discussed in the above examples. In this simplified view, a professor at location 90 is working with three students (designated at "student A", "student B", and "student C"), the students being at separate locations 92, 94 and 96, as shown in FIG. 6. The professor and the students all have copies of the same DVDs which contain the course material and examples, where everyone has installed his/her own disk at a networked DVD player at their location (as indicated by shaded appliances 91, 93, 95 and 97 in FIG. 6). At the designated time, everyone uses a conventional teleconference service (not shown) to establish a voice conference call, using a previously-assigned bridge number and host/participant code.

Each participant (both the professor and the students) then executes the steps of: (1) requesting an enter collaboration page from server 26; (2) entering the conference number and host/participant code information on the page; and (3) submitting the completed page to collaboration server 26. These actions then cause each home appliance 91, 93, 95 and 97 to create TCP connections to collaboration server 26. In this particular example, the professor's appliance can be recognized as controlling the viewing session. That is, collaboration server 26 may be configured to recognize certain commands (such as "play", "skip", "search", etc.) from only appliance 91 (that is, deliberately not forwarding these commands if received from a student's appliance), while still allowing each of the students' appliances to participate in a limited manner, such as by allowing any one student to "stop" or "pause" the viewing (to ask a question, for example). In addition to these simple capabilities, the collaborative viewing process of the present invention may also be configured to allow for more sophisticated capabilities that are of particular interest in a distance learning situation. For example, multimedia content can include interactive capabilities so that a student can be tested on the material that was presented. The section of the multimedia content that contains the exam questions and possible answers can be "locked" to be accessible only by the professor during the collaboration. It is also possible for a group to work together on an interactive "tour", where decisions can be made by a majority vote of the participants. In general, the multimedia content that is distributed via DVDs (or transmitted to set-top boxes) can contain metadata that can be used during the collaboration activities. For example, as mentioned above, courseware can contain exams. The questions and answers can be "locked" so that students cannot see this content until it is unlocked by a teacher during a collaboration. Other types of multimedia content can support group decisions and interactive capabilities.

What is claimed is:

1. A collaboration server, in communication with a plurality of network-based appliances, the collaboration server comprising:
    a storage device for storing a table; and
    a processor to perform operations, the operations including:
    communicating with the storage device to store information in the table regarding each of the plurality of network-based appliances engaged in an on-going collaboration session, the information including an internet protocol address, a participant identification and a participant password associated with each of the plurality of network-based appliances engaged in the on-going collaboration session and an indication of a control command access privilege associated with each of the plurality of network-based appliances engaged in the on-going collaboration session, the control command access privilege indicative of an override control, wherein if the table indicates that a particular network-based appliance of the plurality of appliances is provided with the override control, the particular network-based appliance is allowed to block control commands submitted by other network-based appliances, wherein the control commands control operations of a distributed video presentation;
    receiving a first control command, to control a first operation of the distributed video presentation, from a first network-based appliance of the plurality of network-based appliances engaged in the on-going collaboration session, wherein the first network-based appliance is associated with access privilege to control access of the distributed video presentation provided to each of the plurality of network-based appliances and wherein the table stores information indicating that the first network-based appliance is provided with the override control to block control commands submitted by each other of the plurality of network-based appliances,
    determining to forward the first control command in response to recognizing the first control command as being submitted by the first network-based appliance;
    transmitting the first control command to each of the other of the plurality of network-based appliances engaged in the on-going collaboration session, wherein the first control command simultaneously controls an operation of the distributed video presentation which is executing at each of the other of the plurality of network-based appliances according to the control command access privilege;

receiving a second control command, from a second network-based appliance of the plurality of network-based appliances, to control a second operation of the distributed video presentation; and allowing the first network-based appliance to block the second control command.

2. The collaboration server of claim 1 further comprising a voice network for establishing a pre-arranged teleconference call between any of the plurality of network-based appliances engaged in the on-going collaboration session.

3. The collaboration server of claim 1 further comprising an identification element for verifying an identity of the first network-based appliance engaged in the on-going collaboration session.

4. The collaboration server of claim 1 wherein the control commands are associated with viewing of the distributed video presentation and wherein the control commands include play, stop, pause skip, reverse, and forward control commands.

5. The collaboration server of claim 1 wherein the first network-based appliance comprises a network-connected digital video disc player.

6. The collaboration server of claim 1 wherein the first network-based appliance comprises a set-top box.

7. The collaboration server of claim 1 wherein the first network-based appliance comprises a personal computer.

8. A method of providing collaborative viewing and control of multimedia content on a plurality of network-based appliances comprising:

receiving, at a collaboration server from each of the plurality of network-based appliances, a request for a web page to initiate a collaborative viewing and a control session;

receiving, at the collaboration server from each of the plurality of network-based appliances, identification information including:

an internet protocol address to initiate the collaborative viewing and the control session;

a participant identification and a participant password; and an indication of a multimedia control command access privilege associated with a respective network-based appliance, the multimedia control command access privilege indicative of an override control;

storing in a table at the collaboration server the identification information, wherein if the table indicates that a particular network-based appliance of the plurality of appliances is provided with the override control, the particular network-based appliance is allowed to block multimedia control commands submitted by other network-based appliances, wherein the multimedia control commands control operations of the distributed video presentation;

initiating at the collaboration server the collaborative viewing and the control session;

receiving at the collaboration server a first multimedia control command, to control a first operation of a distributed video presentation, from a first network-based appliance of the plurality of network-based appliances, wherein the first network-based appliance is associated with access privilege to control access of the distributed video presentation provided to each of the plurality of network-based appliances and wherein the table stores information indicating that particular the first network-based appliance is provided with the override control to block the multimedia control commands submitted by each other of the plurality of network-based appliances;

determining at the collaboration server a second network-based appliance of the plurality of network-based appliances engaged in the collaborative viewing and the control session;

determining, at the collaboration server, to forward the first multimedia control command in response to recognizing the first multimedia control command as being submitted by the first network-based appliance;

transmitting at the collaboration server the first multimedia control command to the second network-based appliance according to the multimedia control command access privilege, wherein the first multimedia control command simultaneously controls an operation of the distributed video presentation which is executing at the second network-based appliance;

receiving at the collaboration server a second multimedia control command, from a second of the plurality of network-based appliances, to control a second operation of the distributed video presentation; and allowing at the collaboration server the first network-based appliance to block the second multimedia control command.

9. The method of claim 8 wherein the identification information is stored in a storage device, the method further comprising:

receiving at the collaboration server an exit command from the second network-based appliance;

removing at the collaboration server the second network-based appliance from the collaborative viewing and the control session;

removing at the collaboration server identification information of the second network-based appliance from the storage device;

determining at the collaboration server if any of the plurality of network-based appliances remain on the collaborative viewing and the control session; and maintaining at the collaboration server the collaborative viewing and the control session if any of the plurality of network-based appliances remain.

10. The method of claim 8 further comprising establishing at a conference call server a teleconference call between the plurality of network-based appliances.

11. The method of claim 10 wherein the identification information is used to establish the teleconference call.

12. The collaboration server of claim 2, wherein the pre-arranged teleconference call occurs substantially simultaneously with the on-going collaboration session.

13. The collaboration server of claim 2, wherein the processor further pushes an initialization page to each of the plurality of network-based appliances and receives identification information entered from each of the plurality of network-based appliances in response to pushing the initialization page.

14. The collaboration server of claim 13, wherein the identification information includes a teleconference bridge number used to establish the pre-arranged teleconference call and the participant password entered by each of the plurality of network-based appliances.

15. The collaboration server of claim 1, wherein the processor further recognizes the first network-based appliance as controlling the distributed video presentation and controlling control commands, wherein the control commands include play, stop, pause skip, reverse, and forward control commands.

16. The collaboration server of claim 1, wherein the second network-based appliance can control the distributed video presentation in a limited manner.

17. The collaboration server of claim 1, wherein the processor further locks multimedia content such that the multimedia content is only accessible by the first network-based appliance during the on-going collaboration session.

18. The collaboration server of claim 17, wherein the processor further unlocks the multimedia content in response to receiving a command from the first network-based appliance.

19. The method of claim 8 further comprising:
   locking the multimedia content such that the multimedia content is only accessible by the first network-based appliance during the collaborative viewing and the control session.

20. The method of claim 19 further comprising:
   unlocking the multimedia content in response to receiving a command from the first network-based appliance.

* * * * *